United States Patent [19]

Foody

[11] 4,021,339

[45] May 3, 1977

[54] WATER FILTER

[76] Inventor: Patrick Foody, 280 Main Road, Hudson, Quebec, Canada

[22] Filed: Sept. 12, 1975

[21] Appl. No.: 612,705

Related U.S. Application Data

[63] Continuation of Ser. No. 544,835, Jan. 28, 1975, abandoned, which is a continuation-in-part of Ser. No. 471,850, May 21, 1974, abandoned.

[30] Foreign Application Priority Data

May 24, 1973 United Kingdom ............ 24994/73

[52] U.S. Cl. .................................. 210/80; 210/81; 210/274; 210/275
[51] Int. Cl.² ......................................... B01D 23/24
[58] Field of Search .............. 210/80, 82, 264, 266, 210/274, 275, 283, 284, 290, 333 R, 333 A, 335, 338, 81

[56] References Cited

UNITED STATES PATENTS

| 136,364 | 3/1873 | Conger | 210/264 |
|---|---|---|---|
| 399,957 | 3/1889 | Wilbur | 210/283 |
| 1,993,142 | 3/1935 | Johnson | 210/283 |
| 2,582,388 | 1/1952 | Mansfield | 210/266 |
| 3,056,502 | 10/1962 | Zwicky | 210/283 |
| 3,382,983 | 5/1968 | Stewart | 210/266 |
| 3,436,260 | 4/1969 | Duff | 210/274 |

FOREIGN PATENTS OR APPLICATIONS

| 432,317 | 4/1969 | Australia |
| 20,944 | 2/1961 | Germany |
| 254,764 | 7/1926 | United Kingdom |
| 1,195,795 | 6/1970 | United Kingdom |
| 1,234,114 | 6/1971 | United Kingdom |
| 1,324,836 | 7/1973 | United Kingdom |
| 1,333,268 | 10/1973 | United Kingdom |

*Primary Examiner*—Frank A. Spear, Jr.
*Assistant Examiner*—Ivars Cintins
*Attorney, Agent, or Firm*—H. Roger Hart; Arthur Schwartz

[57] ABSTRACT

A fluid filter is disclosed wherein the in-flow passes through a plurality of beds in the filter in a generally horizontal direction. Means are provided to backwash the beds of the filter with the backwash fluid travelling through the beds in an upwardly vertical direction. Thus, the direction of flow of the in-flow in substantially normal to the direction of flow of the backwash fluid. Each of the beds is separately confined such that each bed may expand upwardly during backwash.

17 Claims, 3 Drawing Figures

WATER FILTER

CROSS-REFERENCE

This is a continuation of application Ser. No. 544,835, filed Jan. 28, 1975, now abandoned, which was a continuation-in-part of abandoned application Ser. No. 471,850, filed May 21, 1974.

This invention relates generally to filters used for solids liquids separation. Such filters consisting of beds of aggregate, such as sand and/or other particulate matter are commonly used to remove solids from liquids.

The filter of the invention described herein is arranged such that the flow of fluid to be filtered hereinafter referred to as the in-flow is in a substantially horizontal plane. Means are provided to backwash the beds of aggregate with the flow of backwash fluid being substantially normal to the direction of flow in the in-flow.

While the filter of this invention may be used in many applications, one such application will be as part of a system to filter water in a water purification plant.

Originally, filters used for this purpose were constructed having an upper bed of relatively fine aggregate. Such filters were subject to blinding off because substantially all of the floc was deposited on top of or immediately on entering the bed of aggregate. Thus, backwash was required because of head loss rather than filter bed saturation. Because almost all floc was removed immediately on entering the bed of aggregate, such filters were subject to blinding off before the filter bed would have otherwise required cleaning.

More recently, in order to minimize such problems, filters have been designed such that the in-flow passes sequentially through various horizontal beds of graded aggregate. The direction of this in-flow being ususally vertically downwards. In these filters, the in-flow first passes through a relatively coarse medium followed by filtration through sequentially finer filtration media. There is a limit to the possible gradation of filtration media, as in practice the finer material must be heavy enough to prevent filter bed reversal during backwash. Normally, filter bed reversal is prevented in prior art filters such as described by ensuring that the finest grain material which is located toward the bottom of the filter is of a specific gravity considerably greater than the relatively coarser material which is contained at the top of the filter. Thus, in prior art filters, the upward velocity and volume of flow of the backwash fluid is controlled such that the fine material does not travel to the top of the filter. In practice, this means that the specific gravity and/or other physical characteristics of adjacent filter media layers must differ sufficiently to prevent relative upward movement. Because of the difficulty in obtaining filtration aggregate having widely varying specific gravities and/or other physical characteristics, there is a limit to the number of media layer combinations which may be utilized. A serious limitation of this type of filter is that if it becomes plugged over part of its area, the velocity of the backwash water over the remaining area may increase to a point where it can blow through the bed and destroy the filter capabilities. Multi-media filters of this type also exclude the successful utilization of a vigorous air scour. Accordingly, it is an object of this invention to provide a filter which may use any number of media size combinations.

It is known that a filtration bed consisting of particles of aggregate having a generally uniform grain size will remove suspended solids from the in-flow having a diameter smaller than the particles of the aggregate. Hence, a screen which will contain media particles need not present a barrier to turbidity suspended in the in-flow which has penetrated a prior media layer.

Conventionally, backwash fluid is passed through a filtration bed in a direction opposite to the direction of flow of the in-flow. In the filter of this invention, the flow of backwash fluid through a bed is upward substantially normal to the direction of flow of the in-flow.

It is known that during backwash a filtration bed may be most effectively cleaned if the volume and flow rate of the backwash fluid is such that it fluidizes the bed. Fluidizing of a filtration bed however, will not take place unless the bed is free to expand.

During the fluidizing process it is known that the velocity and volume of the backwash water can be controlled such that particles smaller or lighter than the media particles can be cleaned from a filter bed without the washing out of the media particles. The filter of this invention utilizes such known technology. However, the filter of this invention provides the advantages of multi-bed graded filters while eliminating the problem of filter bed reversal.

In drawings which illustrate embodiments of the invention,

Figure 1:
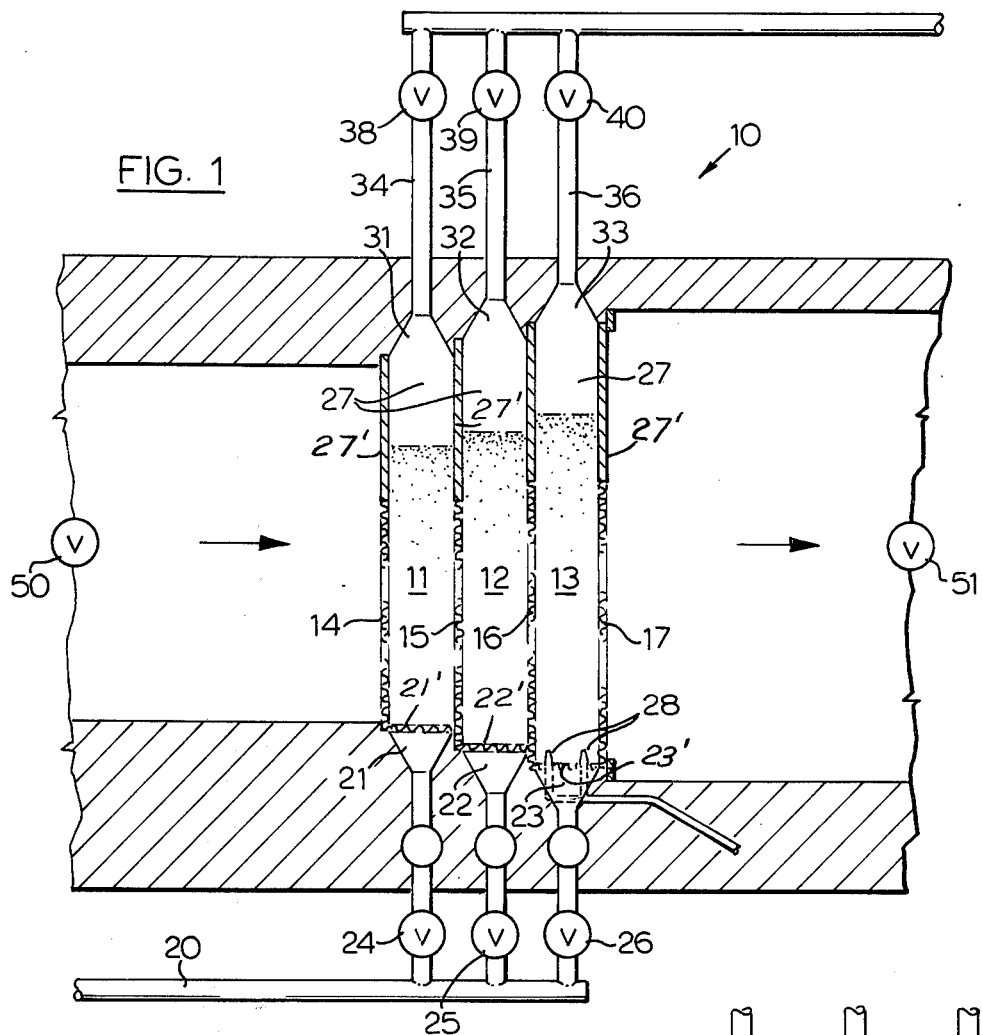
FIG. 1 is a schematic representation of a vertical section through an embodiment of the invention.

In the embodiment shown in FIG. 1 the filter shown generally as 10 has three distinct areas or beds 11, 12 and 13 for sequentially filtering the in-flow. The in-flow enters the filter at the left hand side of FIG. 1 and flows through the filter from left to right. The in-flow initially passes through a bed 11 containing filter material in the form of aggregate of substantially uniform relatively large grain size. The in-flow then passes through beds 12 and 13, each of which contains filter aggregate of relatively uniform but relatively finer grain size. The aggregate in each bed is successively finer thus subjecting the in-flow to a progressively finer filtration.

It will be understood that the filter consists generally of housing which may be of any cross-section configuration. Within the housing the various screens referred to hereinafter may be supported by any known means. The relatively large grain filtration aggregate of bed 11 is supported on either side by pervious material in the form of screens 14 and 15. The filtration aggregate forming bed 12 is supported on either side by screens 15 and 16. The filtration aggregate forming bed 13 is supported on either side respectively by screens 16 and 17.

Screen 14 must be of a mesh suitably fine that the aggregate constituting bed 11 may not pass therethrough. Accordingly, if the aggregate constituting bed 11 is of approximately ¼ inch in diameter, screen 14 must have mesh openings smaller than ¼ of an inch. It is desirable that the mesh of screen 14 be as large as possible while still being small enough to retain the aggregate forming bed 11. Screen 15 which may also be made of any suitable material must be sufficiently small mesh to retain the material of bed 12. In the embodiment shown in FIG. 1, screen 15 serves the dual purpose of maintaining each of beds 11 and 12 and does not permit mixing of the aggregate from bed 11 into bed 12 or the aggregate of bed 12 into bed 11. Each of screens 16 and 17 must be of a mesh suitably fine that the aggregate of bed 13 may not pass therethrough. In the embodiment shown in FIG. 1, screen 16 serves the dual purpose of separating beds 12 and 13 and prevents the mixing of the aggregate of bed 12 into bed 13 or the aggregate of bed 13 into bed 12. Screen 17 must also be of a mesh suitably fine in order that the aggregate constituting bed 13 may not pass therethrough.

As shown in FIG. 1, screen 14 may conveniently be continued along the bottom of bed 11 to form the bottom support of bed 11, or a more conventional filter bottom may be used. Similarly, screen 15 may be continued to form the bottom support for bed 12 and screen 16 may be continued to form the bottom of bed 13. It is necessary to support the bed on the bottom as otherwise the aggregate of each bed would pass downward through backwash channels which will be described hereafter.

Figure 3:
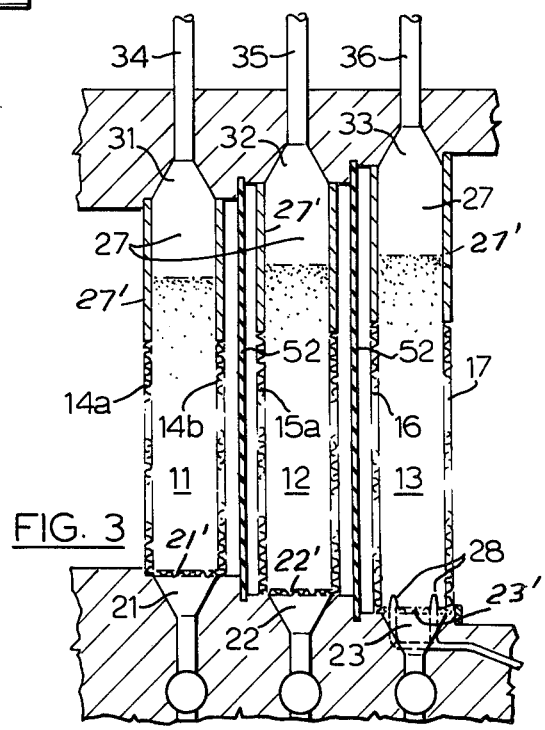
FIG. 3 is a view similar to FIG. 1 showing an alternative construction.

It will be noted that in the embodiments illustrated in FIG. 1 and FIG. 3, the top of each bed of aggregate is above the screens confining each bed. Above each screen is plate or portion of the housing which does not permit passage of in-flow or backwash fluid. Thus, above the top of the aggregate of each bed there is provided expansion space or chamber 27 formed by walls 27' coextensive with screens 14–17 in order that the bed may expand during backwash. The effective filter area of each bed will thus be restricted to the area of the confining screens.

While the embodiment shown in FIG. 1 only three beds of filtration aggregate have been illustrated, it will be obvious that any number of filtration beds could be provided depending only on the designer's choice.

In order to backwash the filter illustrated in FIG. 1, a supply of backwash fluid is provided from conduit 20. Conduit 20 communicates with backwash channels 21, 22 and 23 in the filter housing adjacent beds 11, 12 and 13 respectively. Valves 24, 25 and 26 are provided in order that backwash fluid may be provided to each filtration bed selectively. Communicating with backwash channel 23, which provides backwash fluid to bed 13 there may be jets 28. Jets 28 may be provided to increase the normal backwash fluid and to ensure that the backwash fluid travels vertically upwards through bed 13. Jets 28 will have their own supply of backwash fluid independent from the fluid flowing through channel 23. As these jets may not be required for all applications beds 11 and 12 have been illustrated without similar jets. These jets will be discussed in more detail hereinafter.

At the top of each of beds 11, 12 and 13 there is provided a relatively wide unrestricted channel 31, 32 and 33 respectively. Communicating with each of channels 31, 32 and 33 is an upstanding conduit 34, 35 and 36. It will be noted that there is no screen or other impediment at the top of any of beds 11, 12 and 13 in order that the aggregate of each bed may expand upwardly into the expansion space above each bed. Valves 38, 39 and 40 are provided on each of the upstanding conduits in order to control the flow of exiting backwash fluid.

In operation, the in-flow will enter the embodiment shown in FIG. 1 to the left and flow sequentially through beds 11, 12 and 13, thus being sequentially filtered. If the filter is used in a water purification plant the aggregate of bed 11 may be made of a relatively large grain size which will be sufficient to remove floc from the in-flow but will not be subject to blinding off. The floc will be trapped within bed 11 and not at the surface on screen 14. The amount of floc that may be entrapped in bed 11 before backwash cleaning is necessary, is a function of the depth of bed 11 in the direction of in-flow. Thus, the greater the horizontal thickness of bed 11 as shown in FIG. 1, the more storage of entrapped floc will be provided. Because bed 11 will normally remove a large proportion of the floc from the water bed 11 will probably require backwashing more frequently than beds 12 or 13. However, the relative frequency of backwash for each of the beds would of course depend on the nature of the turbidity being filtered.

When it becomes necessary to backwash one or more of the filter beds, the following procedure may be used. As an example it may be assumed that it is desired to backwash bed 13. In order to backwash the filter it is desirable to stop the in-flow and valve 50 is provided for this purpose. Similarly, valve 51 downstream of the filter is also closed to hyraulically isolate the filter from the normal flow. Each of valves 24, 25, 38 and 39 are closed in order that no backwash fluid will flow through beds 11 and 12. Valve 26 and valve 40 are opened. When the backwash fluid is then supplied under pressure to conduit 20 it will travel through valve 26 upward through channel 23. Backwash fluid may also be expelled from jets 28 and through the filter bottom with an upward velocity through bed 13. Bed 13 may expand upwardly into the expansion space 27 under the action of the backwash fluid. Using known technology sufficient volume and pressure of backwash fluid is provided such that bed 13 will be fluidized. However, the quantity and pressure of backwash fluid will be controlled such that the aggregate constituting bed 13 will not flow out of the filter. All material entrapped in bed 13 which is smaller or has a specific gravity lighter than the aggregate constituting bed 13 will travel upward with the backwash fluid through the conduit 36 and out to waste.

It may be desirable to inject air into the backwash water to promote a more vigorous and effective backwash. In prior art filters of the multi-bed graded type, such vigorous action often caused filter bed reversal. However, in this filter, an air scour may be used as the filter beds cannot become inter-mixed. Air may be injected into conduit 20 or directly at the bottom of each bed.

Once bed 13 has become fluidized by the action of the backwash fluid the resistance to flow of the backwash fluid will reduce due to the expansion. Bed 12 which will be hydraulically confined as a result of closing valves 25 and 39 cannot expand and therefore will not fluidize when bed 13 is being backwashed. Accordingly, the flow of backwash fluid will not to any substantial extent pass upward through bed 12. Also, because bed 13 has been fluidized the backwash fluid will not to any substantial extent travel vertically upwards downstream of screen 17. However, in order to minimize any tendency of the backwash fluid to flow out through screen 17, jets 28 may be provided which will impart a substantial upwardly directed velocity of this portion of the backwash fluid. Whether or not jets 28 are required for any particular bed of aggregate will depend on the aggregate chosen to constitute the bed.

Another method of ensuring that adjacent beds do not fluidize under influence of backwash fluid flowing out of the bed being cleaned is to ensure that sufficient aggregate is provided to fill the bed above the screen or portion thereof which permits flow of in-flow. As long as the weight of the aggregate through which there is no flow of backwash fluid is sufficient to prevent expansion of any parts in which there is flow of backwash fluid, a bed cannot be fluidized. Accordingly, it is recommended that the top of the aggregate forming each bed should be well above the utilizable portion of the confining screens as is shown in FIGS. 1 and 3.

The embodiment shown in FIG. 3 is substantially the same as that shown in FIG. 1 except that each of beds 11, 12 and 13 have been separated by a small space. In this embodiment, bed 11 is confined by screens 14a and 14b. Bed 12 is confined by screens 15a and 15b, and bed 13 is confined by screens 16 and 17. In this embodiment, diaphragms or other convenient means shown generally as 52 may be used to isolate each bed during backwash to ensure that backwash fluid intended for any one bed does not flow into the adjacent bed.

It is not necessary that the diaphragms completely seal off each bed. As long as no substantial flow of backwash fluid passes around the diaphragm, it will not be possible to fluidize the next adjacent bed. It will of course be necessary to remove the diaphragms or in some way permit flow around the diaphragm when the filter is not being backwashed. One method of accomplishing this would be to use a rectangular diaphragm which could be slid in a vertical plane out of the normal flow path when not required. If the frame of the diaphragm were rectangular, sealing members could be located on opposite edges. The filter housing may be equipped with cooperating sealing members which would seal against leakage out of the filter housing both when the diaphragm is in place to block flow and when slid out to permit flow through the filter.

The purpose of the diaphragm is simply to inhibit horizontal flow of backwash fluid. Accordingly, the diaphram need not act as a complete seal. Other means for inhibiting horizontal flow of backwash fluid will occur to those skilled in the art.

Figure 2:
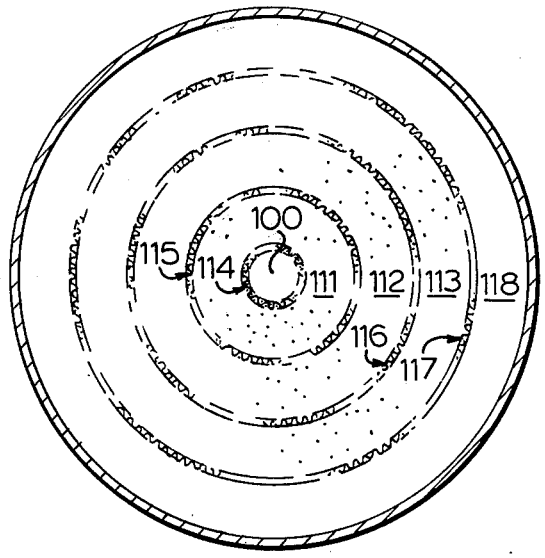
FIG. 2 is a schematic representation of a horizontal section of another embodiment of the invention.

FIG. 2 shows another embodiment of this invention in which each of the filtration beds is annular in horizontal cross-section. In the filter of this embodiment, the in-flow will be vertically downward through conduit 100. The in-flow will then flow radially in a substantially horizontal plane outward through annular beds 111, 112 and 113. Bed 111 is confined at its inner and outer radii by screens 114 and 115 respectively. Bed 112 is confined at its inner and outer radii by screens 115 and 116 respectively. Bed 113 is confined on its inner and outer radii respectively by screens 116 and 117. The filtered fluid will then flow into annular chamber 118 and then out of the filter through any suitable conduit means. In this embodiment of the invention the backwash channels in the bottom of the filter (not shown) will be of annular configuration in order to upwardly selectively backwash each of beds 111, 112 and 113, in the same manner as explained in association with the embodiment shown in FIG. 1.

The radial filter which is possible, using the technology of this invention and shown in FIG. 2, is advantageous in that it provides increasing filter bed surface area for each successive filter bed. It is often the case in conventional filters that the flow-through possible is greater in a bed of relatively coarse aggregate than in a bed of the same effective surface area of relatively fine aggregate. Thus, using the radial flow filter and the technology of this invention, a filter may be constructed having a relatively small surface area bed having relatively large diameter filtration aggregate at the inner bed and having a relatively large surface area at an outer bed having a relatively fine filtering aggregate.

In each of the above embodiments it has been stated that the in-flow flows through the filter in a substantially horizontal direction while the backwash flow is substantially vertical. However, the beds in such a filter need not be vertical. As long as the angle of any bed in the filter to the vertical does not exceed the angle of repose for the aggregate in that bed, the aggregate will fall back into place following backwash. Accordingly, the terms substantially horizontal, and substantially vertical are to be understood to include possible variation up to but not greater than the minimum angle of repose for the aggregate forming a bed within such filter.

It will be obvious to those skilled in the art that the filters embodying this invention can be manufactured in any of several ways without departing from the scope of the invention which is defined by the appended claims.

I claim:
1. A fluid filter comprising:
   a. a housing containing a plurality of beds of filter media connected in series, each of said beds being confined in a substantially horizontal direction by at least two substantially vertical means pervious to the flow of fluid, means to admit in-flow fluid to a first bed of said series, said beds being constructed and arranged such that the in-flow flows through said beds in sequence and in a substantially horizontal direction, means to withdraw fluid from a last bed of said series,
   b. each of said beds including an expansion chamber located above said beds, said chamber being enclosed in the horizontal direction by impervious walls substantially coextensive with said pervious means whereby the bed is unconfined in the vertical direction, said filter media filling said beds to a level substantially below the top of said chambers,
   c. individual means in each bed for selectively backwashing and fluidizing by expanding the filter media into said expansion chamber in each of said beds simultaneously or individually, said individual backwashing and fluidizing means being located at the bottom of each of said beds,
   d. individual means for exhausting backwash fluid from the top of each of said beds whereby flow of backwash fluid through said beds is upward substantially normal to the direction of flow of the in-flow.
   e. whereby said exhausting means and said selective backwashing means control the flow of backwash fluid through each of said beds and fluidizes essentially only such bed being backwashed.

2. The filter of claim 1, in which said beds are a series of concentric annulae in horizontal cross-section.

3. The filter of claim 1, wherein said means to backwash each of said beds include means which permit an air scour as part of said backwash.

4. The filter of claim 1 wherein said chamber include downwardly extending plates forming said walls.

5. The filter of claim 1 wherein said beds have, in the direction of flow, progressively finer filter media therein and said substantially vertical pervious means are in the form of a plurality of screens including:
   a. a first screen adjacent the inlet end having mesh openings slightly smaller than the filter media in a first bed,
   b. a second screen from the inlet end having a mesh slightly smaller than the mesh in the first screen and the filter media in a second bed, and
   c. a third screen from the inlet end having a mesh slightly smaller than the filter media in the second bed.

6. The filter of claim 1 including jet means positioned in the bottom of at least one of said beds for increasing the amount and force of the backwash fluid.

7. The filters of claim 1 including a diaphram removably positioned between adjacent beds and capable of removal during backwash.

8. The filter of claim 1 wherein said beds include progressively larger volumes of filter media therein.

9. A filter as defined in claim 1 including pervious means extending across the bottom of each bed and supporting the entire bed.

10. A method of filtering a liquid and backwashing a series of filters comprising:
   a. providing an inlet and an outlet for liquid being filtered,
   b. providing a plurality of filter beds substantially transverse to the liquid flow, said beds being formed by:
      1. positioning substantially vertical pervious material across the liquid flow;
      2. providing an expansion chamber above each of said beds, said chamber having impervious walls substantially coextensive with said pervious material whereby the bed is unconfined in the vertical direction;
      3. placing different sized filter media in each of said beds to a level substantially below the top of of said chambers;
      4. filtering the liquid successively through each of said beds;
   c. selectively backwashing said beds individually or simultaneously in an upward direction at a sufficient pressure for fluidizing the beds by expanding the filter media into said chamber only in such bed or beds being backwashed by forcing backwash fluid up from the bottom of the bed and out the top thereof through an independent backwash outlet.

11. The method of claim 10 wherein the selective backwashing includes:
   a. providing valve means at the bottom of each bed,
   b. closing the bottom valve for each bed not being backwashed,
   c. opening the bottom valve for the bed being backwashed whereby the bed being backwashed is fluidized.

12. The method of claim 11 including providing valve means at the top of each bed.

13. The method of claim 10 including arranging said beds in a series of concentric annulae.

14. The method of claim 13 including flowing the liquid to be filtered outwardly from the center of the series of annulae.

15. The method of claim 10 wherein at least part of said fluid is a gas.

16. The method of claim 10 including positioning means in the bottom of each bed for supporting the filter media and introducing the backwash fluid.

17. The method of claim 10 including positioning a pervious means extending across the bottom of each bed and supporting the entire bed.

* * * * *